United States Patent Office 3,763,187
Patented Oct. 2, 1973

3,763,187
THIENYLIODONIUM SALTS
Clarence L. Moyle, Clare, Mich., assignor to The Dow Chemical Company, Midland, Mich.
No Drawing. Continuation-in-part of application Ser. No. 154,182, June 17, 1971, which is a continuation-in-part of abandoned application Ser. No. 806,739, Mar. 12, 1969, which in turn is a continuation-in-part of abandoned application Ser. No. 677,772, Oct. 24, 1967. This application June 22, 1972, Ser. No. 265,395
Int. Cl. A61k 27/00; C07d 63/14
U.S. Cl. 260—332.3 R                              9 Claims

ABSTRACT OF THE DISCLOSURE

The present invention is concerned with novel chemical compounds and methods and compositions employing the same, and is particularly directed to a class of thienyliodonium salts which are of value as antimicrobials and microbicides for the control of many bacterial organisms such as the gram-negative and gram-positive types, the molds, the mildews, the fungi and the slimes, and are of particular value for the preservation of paper, plaster, wallboards, fabric, textiles, cooling waters, plasticizers, latices, polymers, resins, adhesives, inks, paints, fuels, cutting oils, greases, seeds, terrestrial plants, detergents, soaps, shampoos and wood.

CROSS-REFERENCE TO RELATED APPLICATIONS

This application is a continuation-in-part of U.S. application Ser. No. 154,182, filed June 17, 1971, the latter being a continuation-in-part of U.S. application Ser. No. 806,739, filed Mar. 12, 1969, now abandoned, the latter being a continuation-in-part of U.S. application Ser. No. 677,772, filed Oct. 24, 1967, now abandoned.

BACKGROUND OF THE INVENTION

Many chemical materials have been proposed as valuable as antimicrobials and as preservatives. However, the materials heretofore proposed usually have been restricted in their scope of utility by virtue of one or more shortcomings such as low toxicity to bacterial organisms, toxicity to a relatively few types of organisms, toxicity to gram-positive types but not to gram-negative types of bacterial organisms, unfavorable toxicity to aquatic or terrestrial plants, unfavorable toxicity to mammals and lack of toxicity in the presence of detergents or soaps. The present compounds and methods wherein they are employed as microbicides have a particular combination of properties, namely, low toxicity to fish, mammals and terrestrial plants and plant parts, and high toxicity to microbes including both gram-negative and gram-positive types in many environments including soaps and detergents such as the fatty acid, anionic, and non-ionic soaps and detergents. A further advantage relates to the instability of the compounds under substantially alkaline aqueous conditions whereby the compounds break down and are degradable to give innocuous decomposition products.

SUMMARY OF THE INVENTION

The novel compounds of the present invention are thienyliodonium salts corresponding to the following formula:

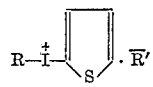

wherein R represents naphthyl, fluorophenyl, chlorophenyl, bromophenyl, alkylphenyl, alkoxyphenyl, nitrophenyl, trifluoromethylphenyl, phenylphenyl, phenoxyphenyl, or disubstituted phenyl in which the substituents are fluoro, chloro, bromo, alkyl or alkoxy and R' represents fluoride, chloride, bromide, iodide, trifluoroacetate, alkanoate, nitrate or tetrafluoroborate. The terms "alkyl" and "alkoxy" refer to groups containing from 1 to 4 carbon atoms, such as methyl, ethyl, propyl, butyl, methoxy, ethoxy, propoxy and butoxy. The term "alkanoate" refers to groups containing from 2 to 4 carbon atoms, such as acetate, propionate, or butyrate. These compounds are crystalline solid materials which are somewhat soluble in many common organic solvents and in water.

The novel compounds make possible the treatment of microbes in inanimate, plant, and external animal habitats with an antimicrobial amount of a 2-thienyliodonium salt having the formula

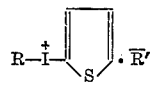

wherein R and R' have the significance previously given, as well as compositions comprising a carrier such as paper, plaster, wallboards, fabrics, textiles, cooling water, plasticizers, latices, polymers, resins, adhesives, inks, paints, fuel, cutting oils, greases, seeds, terrestrial plants, detergents, soap, shampoos and wood.

The compounds have been found to be of high toxicity to many bacterial organisms or plants including gram-negative and gram-positive types, such as *Staphylococus aureus, Salmonella typhosa, Bacillus subtilis, Escherichia coli, Pseudomonas aeruginosa, Candida pelliculosa, Aspergillus terreus, Aerobacter aerogenes, Penicillium chrysogenum, Aspergillus niger, Chaetomium globosum, Penicillium digitatum, Phomopsis citri, Diplodia natalensis, Alternaria solani, Erwinia amylovora* or *Rhizoctonia solani*. The compounds are of low toxicity to terrestrial plants and may be applied to such plants and their habitats in bactericidal amounts to obtain excellent controls of the microbial organisms which attack the seeds, roots or above-ground portions of terrestrial plants. Such practice protects the terrestrial plants and seeds and improves crop yield and the emergence and growth of seedlings. In further operations, it has been found that the compounds may be included in adhesives, cooling waters, inks, plasticizers, latices, resinous polymeric materials, fuels, greases, soaps, detergents, shampoos, cutting oils, and oil or latex paints to prevent mold and mildew and the degradation of such products resulting from microbial attack. By resinous polymeric materials is meant natural and synthetic resinous polymers and plastic compositions or films derived therefrom. Also, the compounds advantageously may be distributed in natural and synthetic fabrics, and paper or other cellulosic products, or may be employed in the impregnation of wood, lumber, wallboard, and plaster to protect such products from the attack of the bacterial organisms of rot, mold, mildew and decay.

DESCRIPTION OF THE PREFERRED EMBODIMENTS

The thienyliodonium trifluoroacetates of this invention can be prepared by reacting together trifluoroacetic acid, thiophene, and an iodosodiacetate having the formula

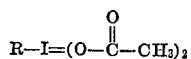

The reaction is preferably carried out in an organic liquid such as methylene chloride, ethylene dichloride, carbon tetrachloride, methylchloroform, heptane, or methylcyclohexane, and conveniently in acetic anhydride or in a mixture of acetic anhydride and trifluoroacetic acid. The reaction goes forward when the reagents are employed in any amounts. The reaction consumes the reagents in substantially equimolecular amounts and the employment of amounts which represent about equimolecular proportions is preferred. The reaction proceeds under temperatures from −30° to 40° C. and is preferably carried out at temperatures of from −20° to 40° C. Upon completion of the reaction, the desired thienyliodonium trifluoroacetate is separated by conventional procedures.

In a convenient method of carrying out the reaction, the trifluoroacetic acid and iodosodiacetate are brought together in the reaction medium and the thiophene reagent added portionwise thereto with agitation. The reaction is exothermic and goes forward readily with the addition of the thiophene. The temperature of the reaction mixture can be controlled by regulating the rate of the addition of thiophene and by external cooling. The reaction essentially is complete upon completion of the addition of the thiophene. Allowing the resulting mixture to stand for a period of time at somewhat elevated temperatures oftentimes gives some improvement in yield. Upon completion of the reaction, the reaction mixture may be distilled under reduced pressure to remove a portion of the low boiling constituents and obtain the desired thienyliodonium trifluoroacetate as a crystalline residue. This residue may be further purified by crystallization from organic solvents or aqueous organic solvents such as acetone, ethylacetate, heptane, or mixtures thereof.

The thienyliodonium chlorides, bromides and iodides can be prepared from the corresponding thienyliodonium trifluoroacetates by the treatment of said trifluoroacetates with an appropriate gaseous or aqueous hydrogen halide. The reaction of the trifluoroacetate with the hydrogen halide preferably is carried out in a liquid reaction medium, conveniently in acetone or ethyl acetate. The amounts of the reagents to be employed are not critical, some of the desired thienyliodonium halide being obtained when employing the reagents in any proportions. However, the reaction consumes the reagents in substantially equimolecular proportions and the use of the reagents in amounts which represent such proportions is preferred. The reaction takes place readily at temperatures of from 0° to 50° C. with the production of the desired thienyliodonium halide and trifluoroacetic acid. During the reaction, the halide salt usually precipitates in the reaction mixture as a crystalline solid. Following the reaction, the reaction mixture may be distilled under reduced pressure to remove low boiling constituents and bring about precipitation of the desired salt product. The thienyliodonium halides so prepared may be separated by decantation or filtration, and further purified by recrystallization from various organic solvents or aqueous organic solvents such as acetone, ethyl acetate, normalpentane, heptane, or mixtures thereof.

The thienyliodonium acetate, propionate, butyrate, nitrate and tetrafluoroborate can be prepared from the corresponding thienyliodonium halides, conveniently from the corresponding chloride. In such operations, the corresponding thienyliodonium halide is treated with silver nitrate, silver tetrafluoroborate or the silver salt of an alkanoic acid in water as reaction medium. The reaction takes place readily with the production of the desired thienyliodonium salt and silver halide. The methods of contacting the reagents and conditions of reaction are as described in the preceding paragraph. Upon completion of the reaction, the desired salt product is separated by decantation or filtration.

The thienyliodonium fluoride salts can be prepared in a similar manner by reacting a thienyliodonium chloride with silver fluoride in water as reaction medium. The reaction takes place readily with the production of the desired thienyliodonium fluoride salt and silver chloride. The methods of contacting the reagents and conditions of reaction are as described in the preceding paragraph. Upon completion of the reaction, the desired fluoride salt is separated from the reaction medium by decantation or filtration.

The iodosodiacetates employed as starting materials as herein described can be prepared in accordance with known methods. In such methods, a dichloride corresponding to the formula $R-ICl_2$ is reacted with lead acetate $(CH_3COO-Pb-OOCCH_3)$. The reaction takes place readily at room temperature with the production of the desired diacetate and lead chloride. The dichlorides employed in such mechanism are conveniently prepared in known procedures by the chlorination of an iodo compound $(R-I)$.

In an alternative procedure, all but the nitroiodosodiacetates can be prepared by reacting the iodoaromatic compound, RI, with peracetic acid in acetic acid and acetic anhydride solution. This reaction conveniently is carried out at room temperature. In these reactions, the desired products are isolated as crystalline solids and are separated and purified in accordance with known procedures.

Good controls of microbes can be obtained when the toxicant compounds are applied to the above-ground portions of terrestrial plants at a dosage of from 1 to 10 or more pounds per acre (1.12–11.2 kg./hectare). In applications to soil for the control of root-attacking microbes, good results are obtained when the salt compounds are distributed at a rate of from 10 to 100 pounds or more per acre (11.2–112 kg./hectare). In general field applications, it is usually preferred that the compounds be distributed to a depth of at least 2 inches (5 cm.) below the soil surfaces.

In the protection and preservation of inks, adhesives, soaps, detergents, greases, fuels, cutting oils, textiles, fabrics, latices, resinous plasticizers, polymeric materials and paper, good results are obtained when the compounds are incorporated in such products in the amount of at least 0.0005 percent by weight. In the protection of seeds, good results are obtained when the seeds are treated with the compounds at a dosage of 0.5 ounce per 100 pounds of seed (0.03 weight percent based on weight of seed). In the preservation of wood, wallboard and plaster, excellent results are obtained when the compounds are incorporated by conventional treatment of these products in the amount of 0.1 pound or more per cubic foot (0.0016 g./cc.) of product. In the treatment of fruit, good results are obtained with liquid washes containing at least 5 parts per million by weight of salt compound.

In the preservation and protection of oil and latex paints and primers against destruction caused by the growth of bacteria, the compounds are preferably employed at concentrations of at least 0.05 percent by weight.

The method of the present invention can be carried out employing unmodified compounds or by employment of liquid or dust compositions containing the toxicants. In such usage, the compounds are modified with one or a plurality of additaments or adjuvants including water, organic solvents, petroleum oils, petroleum distillates, naphthas or other liquid carriers, polymeric thickening agents, urea, surface active dispersing agents and finely divided inert solids. In compositions wherein the adjuvant or helper is a finely divided solid, a surface active agent or the combination of a surface active agent and a liquid diluent, the carrier cooperates with the active component so as to facilitate the invention and to obtain an improved result.

The exact concentration of the toxicants to be employed in the treating composition is not critical and may vary considerably provided the required dosage of the effective agent is supplied. The concentration of toxicant in liquid compositions generally is from 0.0001 to 50 percent by weight. Concentrations up to 95 percent by weight are oftentimes conveniently employed. In dusts, the concentrations of the toxicant can be from about 0.1 to 95 percent by weight. In compositions to be employed as concentrates, the toxicants can be present in a concentration of from 5 to 98 percent by weight.

EXAMPLE 1

4-chlorophenyl-2-thienyliodonium trifluoroacetate 4-chloroiodosobenzene diacetate (17.3 grams; 0.05 mole) was dispersed in a mixture of 15 milliliters each of acetic anhydride and trifluoroacetic acid, and a solution of thiophene (8.4 grams; 0.10 mole) in 60 milliliters of acetic anhydride added slowly thereto. The addition was carried out with stirring in 55 minutes at −20° C. Stirring was continued for 65 minutes at −20° C., and the reaction mixture thereafter warmed and maintained at −3° C. with stirring for 15 hours to insure completion of the reaction. The reaction mixture was concentrated by fractional distillation under reduced pressure up to 50° C., and the resulting residue diluted with 100 milliliters of diethyl ether. During the dilution, the 4-chlorophenyl-2-thienyliodonium trifluoroacetate precipitated as a crystalline solid and was separated by filtration. The solid, recrystallized from a mixture of acetone and normal pentane, melted at 156–157.5° C.

EXAMPLE 2

4-chlorophenyl-2-thienyliodonium chloride 4-chlorophenyl-2-thienyliodonium trifluoroacetate (7 grams; 0.0161 mole) was dispersed in 8 milliliters of an 88 percent by weight solution of formic acid in water, and a saturated aqueous solution of hydrogen chloride (12 milliliters) added thereto at room temperature with stirring. During the addition, 4-chlorophenyl-2-thienyliodonium chloride precipitated as a crystalline solid and was filtered, washed with ether and water, and twice recrystallized from ethanol. The product melted at 217°–218° C.

EXAMPLE 3

4-methylphenyl-2-thienyliodonium trifluoroacetate 4-iodosotoluene diacetate (101 grams; 0.3 mole) was dispersed in a mixture of 250 milliliters of acetic anhydride and 90 milliliters trifluoroacetic acid and the resulting mixture cooled to −20° C. A solution of thiophene (50.5 grams; 0.6 mole) in 300 milliliters of acetic anhydride was added with stirring over a period of 1.5 hours. Stirring was continued for about 2 hours at −20° C., and then for 16 hours at −3° C. The reaction mixture was then distilled under reduced pressure at gradually increasing temperature up to 60° C. to obtain 4-methylphenyl-2-thienyliodonium trifluoroacetate as a residue. The residue was washed with ether and successively recrystallized from ethylacetate and a mixture of acetone and normal hexane. The product melted at 153°–154.5° C.

EXAMPLE 4

1-naphthyl-2-thienyliodonium trifluoroacetate 1-(diacetoxyiodo)-naphthalene (37.2 grams; 0.1 mole) was dispersed in 150 milliliters of acetic anhydride and 30 milliliters of trifluoroacetic acid, and thiophene (16.8 grams; 0.2 mole) dissolved in 100 milliliters of acetic anhydride added, with stirring, over a period of 30 minutes at −20° C. Stirring was continued for 1.5 hours while maintaining the temperature at −20° C., and then at −3° C. for 16 hours. The reaction mixture was distilled to 60° C. at 1–2 mm. to remove low boiling constituents and obtain the 1-naphthyl-2-thienyliodonium trifluoroacetate as a crystalline residue. The residue was washed with ether and recrystallized from acetone. The product melted at 161°–162° C.

EXAMPLE 5

4-nitrophenyl-2-thienyliodonium trifluoroacetate 4-nitroiodosobenzene diacetate (90 grams; 0.245 mole) was dispersed in 250 milliliters of acetic anhydride and 75 milliliters of trifluoroacetic acid, and thiophene (41.2 grams; 0.49 mole) dissolved in 300 milliliters of acetic anhydride added over a period of 2.5 hours at −20° C. The temperature of the reaction mixture was allowed to rise to −5° C. and stirring continued for 14 hours. The reaction mixture was then fractionally distilled to 60° C. at 1–2 mm. to remove low boiling constituents and obtain the 4-nitrophenyl-2-thienyliodonium trifluoroacetate as a crystalline residue. The residue was washed with ether and recrystallized from a mixture of ethyl acetate and acetone. The recrystallized product melted at 150°–152° C.

EXAMPLE 6

Phenyl-2-thienyliodonium tetrafluoroborate

Phenyl-2-thienyliodonium iodide (8.15 grams; 0.0197 mole) is suspended in a mixture of 150 milliliters water and 25 milliliters ethanol and 7.9 grams (0.019 mole) of 47 percent aqueous silver fluoroborate solution containing 7.9 grams (0.019 mole) silver fluoroborate is added thereto. The mixture is stirred at 50°–60° C. for ½ hour, cooled and filtered to remove byproduct silver iodide. The filtrate is treated with charcoal, then filtered, and concentrated by heating at 45° C. under reduced pressure, leaving the phenyl-2-thienyliodonium tetrafluoroborate as a white solid product residue. The solid product is ground with ethyl ether, filtered and dried to give a purified product melting at 124° C. with decomposition.

In similar procedures, the following compounds are prepared.

4-chlorophenyl-2-thienyliodonium iodide, melting at 121°–124° C.
4-methylphenyl-2-thienyliodonium chloride, melting at 225°–227° C., and iodide, melting at 130°–131.5° C.
1-naphthyl-2-thienyliodonium chloride, melting at 169°–171° C.
3,4-dichlorophenyl-2-thienyliodonium trifluoroacetate, melting at 152°–154° C.
3,4-dichlorophenyl-2-thienyliodonium chloride, melting at 152°–154° C., and bromide, melting at 174.5°–176° C.
4-fluorophenyl-2-thienyliodonium trifluoroacetate, melting at 127°–128° C.
4-fluorophenyl-2-thienyliodonium bromide, melting at 172°–173° C.
3-chlorophenyl-2-thienyliodonium trifluoroacetate, melting at 108° C.
3-chlorophenyl-2-thienyliodonium chloride, melting at 224° C.
4-nitrophenyl-2-thienyliodonium chloride, melting at 161°–162° C., and bromide, melting at 149°–151° C.
4-bromophenyl-2-thienyliodonium trifluoroacetate, melting at 177°–179° C.

4-bromophenyl-2-thienyliodonium chloride, melting at 230°–232° C.
3-methylphenyl-2-thienyliodonium trifluoroacetate, melting at 85°–86° C.
3-methylphenyl-2-thienyliodonium chloride, melting at 213°–215° C.
2,5-dimethylphenyl-2-thienyliodonium trifluoroacetate, melting at 159.5°–161° C.
3,4-dimethylphenyl-2-thienyliodonium trifluoroacetate, melting at 127°–130° C.
2,5-dimethylphenyl-2-thienyliodonium chloride, melting at 155.5°–157° C.
3,4-dimethylphenyl-2-thienyliodonium chloride, melting at 147°–150° C.
Phenyl-2-thienyliodonium trifluoroacetate, melting at 158°–160° C.
4-phenoxyphenyl-2-thienyliodonium trifluoroacetate, melting at 123.5°–125.0° C.
2-biphenyl-2-thienyliodonium trifluoroacetate, melting at 146°–148° C.
2-biphenyl-2-thienyliodonium chloride, melting at 175°–178° C.
4-ethoxyphenyl-2-thienyliodonium trifluoroacetate, melting at 148°–150° C.
4-ethoxyphenyl-2-thienyliodonium chloride, melting at 188°–190° C.
3-trifluoromethylphenyl-2-thienyliodonium trifluoroacetate, melting at 108°–109° C.
3-trifluoromethylphenyl-2-thienyliodonium chloride, melting at 180° C. with decompositions.
3-trifluoromethylphenyl-2-thienyliodonium tetrafluoroborate, melting at 137°–138° C.

EXAMPLE 7

Various of the thienyliodonium salts are dispersed in melted nutrient agar to produce culture media containing 0.001 percent by weight of one of the salt compounds. Such melted media are then poured into petri dishes and the solidified surface in each dish inoculated with a 24-hour broth culture, one of the organisms *Staphylococcus aureus* and *Salmonella typhosa*. In a check operation, petri dishes containing unmodified nutrient agar are each individually inocuated in the same manner with the named organisms. After two days incubation at 35° C. the agar surface in each dish is examined for microbial growth. The examination shows that the agar surface in the dishes containing the thienyliodonium salts is free of microbial growth. At the time of these observations the check dishes are found to support a heavy growth of the two named organisms. The thienyliodonium salts employed in the described operations are set forth in the following table:

Phenyl-2-thienyliodonium chloride
2-2'-bisthienyliodonium chloride
4-chlorophenyl-2-thienyliodonium chloride
4-chlorophenyl-2-thienyliodonium iodide
4-nitrophenyl-2-thienyliodonium chloride
4-fluorophenyl-2-thienyliodonium trifluoroacetate
1-naphthyl-2-thienyliodonium chloride
2,2'-bisthienyliodonium iodide
4-methylphenyl-2-thienyliodonium chloride
2,2'-bisthienyliodonium bromide
2,5-dimethylphenyl-2-thienyliodonium trifluoroacetate
2-trifluoromethylphenyl-2-thienyliodonium trifluoroacetate
3,4-dichlorophenyl-2-thienyliodonium trifluoroacetate
4-chlorophenyl-2-thienyliodonium chloride
2,2'-bisthienyliodonium trifluoroacetate
1-naphthyl-2-thienyliodonium trifluoroacetate
Phenyl-2-thienyliodonium bromide
Phenyl-2-thienyliodonium trifluoroacetate
3-chlorophenyl-2-thienyliodonium chloride
Phenyl-2-thienyliodonium tetrafluoroborate
4-ethoxyphenyl-2-thienyliodonium trifluoroacetate.

EXAMPLE 8

4-chlorophenyl-2-thienyliodonium chloride is employed in a paint composition to protect the paint from attack and subsequent degradation by the organisms of mold and mildew. In such operations, the salt compound is dispersed and incorporated in the latex paint in the amount of 0.3 percent by weight of the ultimate paint composition.

The paint employed in these operations is prepared by intimately blending a pigment dispersion with a letdown including a synthetic latex comprising an interpolymer of ethyl acrylate, methyl methacrylate, acrylic acid and methacrylic acid. The paint has the following composition.

| Pigment dispersion: | Approximate lbs. per 100 gallons (g./l.) |
|---|---|
| Water | 140 (168) |
| Potassium tripolyphosphate | 1.5 (1.8) |
| Titanium dioxide | 240 (288) |
| Mica (325 mesh) | 50 (60) |
| Calcium carbonate | 20 (24) |
| Clay (finely ground) | 20 (24) |
| Polypropylene glycol (mol. wt. 1200) | 4 (4.8) |
| Let down: | |
| Methyl cellulose | 150 (180) |
| Synthetic latex | 506 (607) |
| Anti-foam agent | 10 (12) |

Wood panels are then painted with the modified compositions as well as with the unmodified paint. The panels are dried and thereafter exposed two months in a tropical chamber at a relative humidity of 95 percent and a temperature of 82° F. (28°C.). Following this period, the wood panels are examined to ascertain what control of plant growth is obtained. The examination shows a complete control of the growth of the organisms of mold and mildew.

At the time of the observation, the check panels painted with the unmodified composition are found to support a heavy growth of the organisms of mold and mildew covering approximately 75 percent of the painted surfaces.

EXAMPLE 9

Phenyl-2-thienyliodonium chloride, 2,2'-bis-thienyliodonium chloride, and for comparative purposes, diphenyliodonium chloride are individually dispersed in Ivory soap to provide concentrates containing 1 part by weight of iodonium salt to 50 parts by weight of soap. The soap concentrates are serially dispersed and serially diluted with liquid nutrient agar at 42° C. to prepare culture media containing various concentrations of one of the iodonium salts. The culture media are uniformly inoculated with *Staphylococcus aureus* and plated in Petri dishes. The inoculation is carried out from broth cultures of the named organism containing about $5 \times 10^8$ organisms per milliliter in the proportion of one-tenth milliliter of bacterial culture per 20 milliliters of culture medium containing each test compound. In a check operation, nutrient agar containing the same amount of Ivory soap is similarly inoculated with the same organism. After two days' incubation at 37° C., the plates are examined for microbial growth. The examination shows that the plates containing 2.5 parts per million, p.p.m., by weight of phenyl-2-thienyliodonium chloride and 5 parts per million by weight of 2,2'-bis-thienyliodonium chloride are completely free of bacterial growth (referred to as 100 percent kill in tables) of *Staphylococcus aureus* while the plates containing 500 parts per million by weight of diphenyliodonium chloride and the check plates containing no iodonium salt are found to have a heavy uniform growth of the test organism.

The procedure described above is repeated with varying concentrations of 4-chlorophenyl-2-thienyliodonium chloride, 3,4-dichlorophenyl-2-thienyliodonium chloride, and for comparative purposes bis(4-chlorophenyl)iodonium chloride, phenyl-4-chlorophenyliodonium chloride and bis-(2,4-dichlorophenyl)iodonium chloride in a series of tests wherein the culture media are inoculated individually with the organism *Aerobacter aerogenes*. The results obtained are summarized in the following Table 1.

TABLE I

| Compound | Concentration (p.p.m.) | Percent kill of *A. aerogenes* |
|---|---|---|
| This invention: | | |
| 4-chlorophenyl-2-thienyliodonium chloride | 1 | 100 |
| 3,4-dichlorophenyl-2-thienyliodonium chloride. | 1 | 100 |
| For comparison: | | |
| Bis(4-chlorophenyl)iodonium chloride | 100 | 0 |
| Phenyl-4-chlorophenyliodonium chloride | 10 | 0 |
| Bis(2,4-dichlorophenyl)iodonium chloride | 10 | 0 |

The procedure described above is again repeated in a series of tests wherein the culture media are inoculated individually with the organism *Salmonella typhosa* and wherein the culture media contained varying concentrations of one of the iodonium salts, as set forth in following Table II. The plates upon examination exhibit results summarized in Table II.

TABLE II

| Compound | Concentration (p.p.m.) | Percent kill of *S. typhosa* |
|---|---|---|
| 2,2'-bisthenyliodonium chloride | 5 | 100 |
| Phenyl-2-thienyliodonium chloride | 2.5 | 100 |
| 4-chlorophenyl-2-thienyliodonium chloride | 1 | 100 |
| 4-bromophenyl-2-thienyliodonium chloride | 5 | 100 |
| 3,4-dichlorophenyl-2-thienyliodonium chloride | 1 | 100 |
| For comparison: | | |
| Diphenyliodonium chloride | 500 | 0 |
| Phenyl-4-chlorophenyliodonium chloride | 10 | 0 |
| Bis(4-bromophenyl)iodonium chloride | 10 | 0 |
| Bis(4-bromophenyl)iodonium bromide | 10 | 0 |
| Bis(2,4-dichlorophenyl)iodonium chloride | 10 | 0 |

The procedure described above is once again repeated with each of 2,2'-bisthienyliodonium chloride, phenyl-2-thienyliodonium chloride, 4-bromophenyl-2-thienyliodonium chloride, bis(4-bromophenyl)iodonium chloride and bis(4-bromophenyl)iodonium bromide in a series of tests wherein the culture media are inoculated individually with the organism *Aerobacter aerogenes*. The results obtained are summarized in the following Table III.

TABLE III

| Compound | Concentration (p.p.m.) | Percent kill of *A. aerogenes* |
|---|---|---|
| 2,2'-bisthienyliodonium chloride | 5 | 100 |
| Phenyl-2-thienyliodonium chloride | 2.5 | 100 |
| 4-bromophenyl-2-thienyliodonium | 5 | 100 |
| For comparison: | | |
| Bis(4-bromophenyl)iodonium chloride | 10 | 0 |
| Bis(4-bromophenyl)iodonium bromide | 10 | 0 |

EXAMPLE 10

The growth-inhibitory activity of the below-indicated compounds against some microorganisms most relevant to the human skin was determined by standard agar dilution techniques to provide the data given in following Table 1.

TABLE 1

A. Antimicrobial Activity in the Presence of Ivory Soap

| Compound | Minimum growth inhibitory concentration p.p.m. | | |
|---|---|---|---|
| | *S. aureus* | *P. aeruginosa* | *S. typhosa* |
| 1. (diphenyliodonium chloride) | >500 | >500 | >500 |
| 2. (phenyl-2-thienyliodonium chloride) | 5 | 5 | 5 |
| 3. (2,2'-bisthienyliodonium chloride) | 0.5 | 5 | 0.5 |
| 4. (bis(4-chlorophenyl)iodonium chloride) | 10 | >100 | >10 |
| 5. "Iodonium 235" (bis(4-chlorophenyl)iodonium chloride) | 10 | >100 | 10 |
| 6. (4-chlorophenyl-2-thienyliodonium chloride) | 1 | 1 | 1 |
| 7. (bis(3,4-dichlorophenyl)iodonium chloride) | 5 | >500 | >10 |
| 8. (3,4-dichlorophenyl-2-thienyliodonium chloride) | 1 | 1 | 1 |
| 9. (4-ethoxyphenyl-phenyliodonium chloride) | >500 | >500 | >500 |
| 10. (4-ethoxyphenyl-2-thienyliodonium chloride) | 5 | 50 | 5 |

B. Antimicrobial Activity in the Absence of Soap

| Compound | Minimum growth inhibitory concentration p.p.m. | | |
|---|---|---|---|
| | *S. aureus* | *P. aeruginosa* | *S. typhosa* |
| 11. (3-CF$_3$-phenyl-4-methoxyphenyliodonium chloride) | 10 | 500 | 100 |
| 12. (3-CF$_3$-phenyl-2-thienyliodonium chloride) | <1 | 50 | 10 |

TABLE 1—Continued

| Compound | Minimum growth inhibitory concentration p.p.m. | | |
|---|---|---|---|
| | S. aureus | P. aeruginosa | S. typhosa |
| 13. 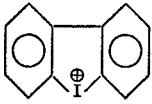 Lac⊖ [1] | 3.13 | 3.13 | -------- |
| 14. 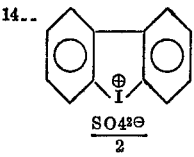 $\frac{SO_4^{2\ominus}}{2}$ | 5 | 5 | -------- |
| 15. 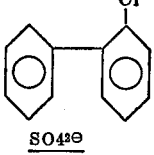 $\frac{SO_4^{2\ominus}}{2}$ | 1.56 | 3.13 | -------- |
| 16. 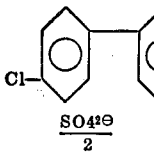 $\frac{SO_4^{2\ominus}}{2}$ | 1.56 | 6.25 | -------- |
| 17. 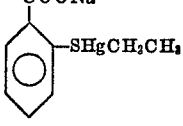 Merthiolate® | <1 | 1 | <1 |
| 18. 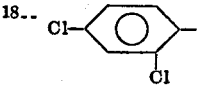 Irgasan® | 1 | >300 | 1 |

[1] Lac=lactate.

In Table 1, the first column gives the chemical structures of the test compounds, while the additional columns give the names of the test organisms and the minimum inhibitory concentration in parts per million (p.p.m.) of the compounds listed against the particular microorganisms indicated. A dash indicates that the compound was not tested against that organism. For each p.p.m. of test compounds, 50 p.p.m. of Ivory soap was also present in the culture medium for part A of Table 1, while in part B of Table 1, the culture medium was free of any additive other than the test compound. The data for compounds 13 through 16 of part B of Table 1 were taken from Cannon U.S. Pat. 3,207,660 while those for compounds 17 and 18 were taken from trade literature.

The data show a difference in kind in antimicrobial activity for the thienyliodonium compounds when compared with diphenyl- and substituted diphenyliodonium compounds known to have some antimicrobial activity and closest in structure to the thienyliodonium compounds. Also, the data show no substantial difference as between culture media containing Ivory soap and not containing Ivory soap.

The antimicrobial effectiveness against *P. aeruginosa* (*Pseudomonas aeruginosa* or Pseudomonas) of the thienyliodonium salts is noteworthy. This organism is considered one of the most dangerous pathogens and is responsible for the constantly increasing number of hospital cross infections caused by gram-negative bacteria in the last decade. See, for example, "Disinfection," M. A. Benarde, ed., Marcel Dekker, Inc., New York, N.Y., 1970, 260–263 and "Inhibition and Destruction of the Microbial Cell," W. B. Hugo, ed., Academic Press, New York, N.Y., 1971, 330–333.

The range-finding oral median lethal dose ($LD_{50}$) for iodonium and other antimicrobial compounds, including diphenyl- and thienyliodonium salts as well as several proprietary products was determined in mice. Compounds 1 through 11 of following Table 2 were fed to five groups of two mice each, the test compound being administered in suspension in corn oil as a single oral dose and the mortality experience of the mice was observed over a 14-day period. Data for compounds 12 through 15 were taken from U.S. Pat. 3,207,660, and for compounds 16 through 18 were taken from trade literature.

TABLE 2
Comparison of Oral Median Lethal Dose ($LD_{50}$) of Iodonium Salts and Proprietary Antimicrobials

| Compound | | Toxicity, oral $LD_{50}$ (mice), mg./kg. |
|---|---|---|
| 1 | 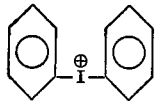 | 56.2 |
| 2 | 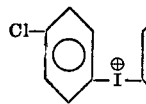 | 68 |
| 3 | 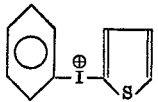 | 2,000 |
| 4 | 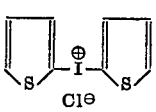 | 500 |
| 5 |  | >4,000 |
| 6 |  | 2,000 |
| 7 | 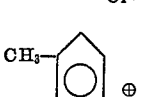 | 750 |
| 8 | 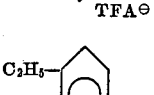 | 1,500 |

TABLE 2—Continued

| Compound | | Toxicity, oral LD$_{50}$ (mice), mg./kg. |
|---|---|---|
| 9 | CH$_3$—⟨phenyl⟩—I⁺—⟨thienyl⟩—CH$_3$  TFA⁻[1] | 3,000 |
| 10 | ⟨phenyl⟩—O—⟨phenyl⟩—I⁺—⟨thienyl⟩  TFA⁻[1] | 3,000 |
| 11 | ⟨phenyl⟩—⟨phenyl⟩—I⁺—⟨thienyl⟩  TFA⁻[1] | 4,000 |
| 12 | dibenzofuran-I⁺  Lac⁻[2] | 2.51 |
| 13 | dibenzofuran-I⁺  SO$_4^{2-}$/2 | 8.75±0.57 |
| 14 | Cl,Cl-dibenzofuran-I⁺  SO$_4^{2-}$/2 | 8–10 |
| 15 | Cl,Cl-dibenzofuran-I⁺  SO$_4^{2-}$ | 21.32±3.2 |
| 16 | Merthiolate® (COONa—⟨phenyl⟩—SHgCH$_2$CH$_3$) | 66 (³S.C.) |
| 17 | Irgasan® (Cl—⟨phenyl⟩(Cl)—O—⟨phenyl⟩(Cl)—OH) | 4,000 |
| 18 | Hexachlorophene | 161 |

[1] TFA=trifluoroacetate.
[2] Lac=lactate.
[3] S.C.=subcutaneous.

Table 2 shows that whereas (p-chlorophenyl)-(phenyliodonium)chloride is the most effective antimicrobial of the diphenyliodonium type, it has a low and undesirable LD$_{50}$ of 68 mg./kg. in mice. The antimicrobial iodolium compounds of Cannon U.S. Pat. 3,207,660 have even lower values ranging between 8 and 23.32±3.2 mg./kg. in mice. Of the proprietary compounds, Merthiolate® has an LD$_{50}$ of 66 subcutaneously and hexachlorophene has an oral LD$_{50}$ of 161. Irgasan antimicrobial, having a reported LD$_{50}$ of 4,000 mg./kg. in mice, has a minimum growth inhibiting concentration of more than 300 p.p.m. against *Pseudomonus aeruginosa*. The thienyliodonium antimicrobials are more effective and have desirably high LD$_{50}$ values of 500 to more than 4000, as shown.

Based on the screening data reported above, which showed for the thienyliodonium salts in general a high level of antimicrobial activity against gram-positive and g.-neg. bacteria coupled with a desirable low level of toxicity, additional tests were carried out for the representative compound p - chlorophenyl-2-thienyliodonium chloride, hereinafter referred to as "ClPhThICl," as follows. Conventional serial dilution tests for inhibitory activity of the said compound against a plurality of gram-positive and gram-negative bacteria, fungi and yeasts were carried out starting with the following formulations.

(I) 0.1% ClPhThICl: 5.0 gms. of dried powdered Dove soap (coconut oil acid ester of sodium isethionate) in 94.9 ml. of water
(II) 0.25% of ClPhThICl: 55% Varifoam YM (modified alcohol sulfate, 38% active), 0.1% citric acid in 44% water, pH 5.5
(III) 0.125% ClPhThICl: 50% Terigol 15–S–9 (polyglycol ether of linear alcohol, 100% active), 0.05% citric acid in 50% water, pH 2.2
(IV) 0.25% ClPhThICl in Touch of Sweden hand lotion, pH ca. 5.5
(V) 0.25% CiPhICl: 0.1% citric acid in glycerin
(VI) 0.25% ClPhThICl: 0.1% citric acid in ethanol
(VII) 0.1% ClPhThICl: 0.1% citric acid in Dowanol DPM (dipropylene glycol monomethyl ether)
(VIII) 0.1% ClPhThICl: in water Formulations VI and VII were aged 3 weeks at room temperature before being tested for antimicrobial activity. The other compositions were not aged before testing.

Test procedure: Initially, a stock solution in water for each formulation was prepared by dilution to contain 100 p.p.m. ClPhThICl. From this 100 p.p.m. stock solution, test agars were prepared by mixing appropriate amounts of the stock solution with a measured amount of sterile molten agar that had been cooled to 60° C. The treated molten agar was immediately mixed and poured into a sterile Petri dish. Nutrient agar was used for testing bacteria and malt yeast agar for fungi and yeasts. In most cases, the test agars containing 10, 7.5, 5.0, 2.5, 1.0, 0.75, and 0.5 p.p.m. of ClPhThICl were prepared from each formulation as described above. In the case of fungi and yeasts, a concentration of 50 p.p.m. was also tested. Agars containing the formulation without the antimicrobial were also included at the appropriate levels to test the activity of the formulation.

The test cultures were applied to the surface of the hardened agar with a sterile cotton swab. A streak of about 1½ inches long was made. The inoculated plates were incubated for 48 hours at 30° C. Results in Table 3 are recorded as growth or no growth for the minimum concentration for 100% inhibition of growth. In all cases, the next lower concentration tested failed to inhibit growth of the microorganism completely. The blank spaces indicate that the formulation was not tested against the indicated microorganism.

TABLE 3

A: Minimum Concentration in p.p.m. of ClPhThICl Giving 100% Inhibition of Bacteria

| Microorganism | Formulation | | | | | | | |
|---|---|---|---|---|---|---|---|---|
| | I | II | III | IV | V | VI [2] | VII [2] | VIII |
| *Staphylococcus aureus* | 1.0 | (¹) | <1.0 | 2.5 | 2.5 | 2.5 | 5.0 | 0.75 |
| *Staphylococcus albus* | 0.75 | <1.0 | 2.5 | 2.5 | <1.0 | | | 0.25 |
| *Salmonella typhosa* | <0.5 | <1.0 | (¹) | <1.0 | <1.0 | 2.5 | 5.0 | 0.75 |
| *Salmonella paratyphi* | <0.5 | <1.0 | <1.0 | 2.5 | <1.0 | | | <0.5 |
| *Salmonella choleraseus* | <0.5 | | | | | | | <0.5 |
| *Bacillus subtilis* | <0.5 | <1.0 | (¹) | <1.0 | <1.0 | 1.0 | 1.0 | <0.5 |
| *Bacillus mycoides* | 1.0 | (¹) | (¹) | 2.5 | 2.5 | | | 2.5 |
| *Bacillus megaterium* | 1.0 | (¹) | (¹) | 2.5 | 2.5 | | | 2.5 |
| *Pseudomonas aeruginosa* | 0.75 | <1.0 | 5.0 | <1.0 | <1.0 | 5.0 | 5.0 | 0.75 |
| Pseudomonas spp. PRD–10 | 1.0 | (¹) | (¹) | 2.5 | 2.5 | 2.5 | 2.5 | 2.5 |
| *Pseudomonas fluorescens* | 2.5 | 2.5 | 2.5 | 2.5 | 2.5 | | | <0.5 |
| *Aerobacter aerogenes* | 1.0 | 2.5 | 2.5 | 2.5 | 2.5 | 2.5 | 5.0 | 2.5 |
| *Alcaligens faecales* | 5.0 | 2.5 | 2.5 | 5.0 | 7.5 | 7.5 | 7.5 | 1.0 |
| *Escherechia coli* | 1.0 | 2.5 | 2.5 | 2.5 | 2.5 | 2.5 | 5.0 | 2.5 |
| *Proteus vulgaris* | 2.5 | (¹) | 2.5 | 5.0 | 7.5 | | | 2.5 |
| *Proteus mirabilis* | 2.5 | <1.0 | <1.0 | 5.0 | 7.5 | | | |
| *Proteus morginii* | 1.0 | | | | | | | <0.5 |
| *Flavobacteria arborescens* | 2.5 | <1.0 | 2.5 | 5.0 | 5.0 | | | <0.5 |
| *Micrococcus candidus* | 2.5 | 2.5 | 2.5 | 5.0 | 10 | | | 1.0 |
| *Sarcina lutea* | 0.75 | (¹) | (¹) | 2.5 | 2.5 | | | |
| *Brevibacterium ammoneagenes* | 1.0 | (¹) | (¹) | 2.5 | 2.5 | | | 2.5 |
| *Serratia marcescens* | 2.5 | 5.0 | 5.0 | 2.5 | 2.5 | | | |
| *Streptococcus mutans* | (¹) | | | <1.0 | <1.0 | | | |

[1] Formulation itself indicates activity at a concentration equivalent to the amount used which would contain 10 p.p.m. of ClPhThICl.
[2] Formulation aged 3 weeks at room temperature before being tested.

B: Minimum Concentration in p.p.m. of ClPhThICl Giving 100% Inhibition of Fungi and Yeast

| Microorganism | Formulations | | |
|---|---|---|---|
| | I | IV | V |
| *Saccharomyces cereviseae* | >50 | 50 | 50 |
| *Candida albicans* | 5.0 | 50 | >50 |
| *Candida pelliculosa* | 10 | >50 | >50 |
| *Trichophyton mentagrophytes* | (¹) | 50 | 50 |
| *Aspergillus terreus* | (¹) | 50 | >50 |
| *Pencillium chrysogenum* | (¹) | 50 | >50 |
| *Pityrosporum ovale* | 2.5 | 5.0 | 7.5 |
| *Trichoderma spp* | 10 | 50 | >50 |

[1] Formulation itself indicates activity at a concentration equivalent to the amount which would contain 50 p.p.m. of ClPhThICl.

Also, the oral median lethal dose, $LD_{50}$, was determined for ClPhThICl in Swiss mice (Cox strain) within a weight range of 16 to 22 grams. Five groups of mice, each consisting of 15 males and 15 females, were given ClPhThICl in an aqueous 0.5 percent Methocel hydroxypropyl methylcellulose (4000 cps.) suspension at a concentration of 300 mg./ml. The compound was administered as a single oral dose at 0.2 logarithmic dose intervals (708, 1120, 1780, 2820, 4450 mg./kg.) and the following mortality experience was noted:

| Group | Dose (mg./kg.) | No. dead at 24 hours | | No. dead at 7 days | | No. dead at 14 days | |
|---|---|---|---|---|---|---|---|
| | | Males | Females | Males | Females | Males | Females |
| 1 | 708 | 0/15 | 0/15 | 0/15 | 1/15 | 1/15 | 2/15 |
| 2 | 1,120 | 0/15 | 0/15 | 1/15 | 1/15 | 1/15 | 2/15 |
| 3 | 1,780 | 3/15 | 4/15 | 8/15 | 8/15 | 9/15 | 8/15 |
| 4 | 2,820 | 11/15 | 8/15 | 14/15 | 14/15 | 14/15 | 14/15 |
| 5 | 4,450 | 15/15 | 13/15 | 15/15 | 15/15 | 15/15 | 15/15 |

The percent of total mortalities occurring was 16.0, 66.6, 81.5, and 91.3 at 6, 24, 48 and 72 hours post-treatment, respectively. The last death occurred in a female (1120 mg./kg. group) on day 14 of the study. $LD_{50}$ values and 95 percent confidence limits calculated at 24 hours, 7 and 14 days by the method of Litchfield-Wilcoxon were as follows:

24 hours:
  Male mice, 2300 mg./kg.; 95% confidence limits, 1916–2760 mg./kg.
  Female mice, 2700 mg./kg.; 95% confidence limits, 2300–3591 mg./kg.

7 days:
  Male mice, 1760 mg./kg.; 95% confidence limits, 1353–2288 mg./kg.
  Female mice, 1700 mg./kg.; 95% confidence limits, 1172–2455 mg./kg.

14 days:
  Male mice, 1760 mg./kg.; 95% confidence limits, 1353–2288 mg./kg.
  Female mice, 1580 mg./kg.; 95% confidence limits, 1264–1975 mg./kg.

The oral median lethal dose ($LD_{50}$) of ClPhThICl was also determined in Sprague-Dawley (Cox strain) rats within a weight range of 93 to 118 grams. Five groups of rats, each consisting of 10 males and 10 females, were given the compound in an aqueous 0.5 percent Methocel hydroxypropyl methylcellulose (4000 cps.) suspension at a concentration of 300 mg./ml. The compound was administered as a single oral dose at 0.2 logarithmic dose intervals (709, 1120, 1780, 2820, 4450 mg./kg.), and the following mortality experience was noted:

| Group | Dose (mg./kg.) | No. dead at 24 hours | | No. dead at 7 days | | No. dead at 14 days | |
|---|---|---|---|---|---|---|---|
| | | Males | Females | Males | Females | Males | Females |
| 1 | 708 | 1/10 | 0/10 | 1/10 | 0/10 | 1/10 | 0/10 |
| 2 | 1,120 | 1/10 | 2/10 | 2/10 | 6/10 | 2/10 | 6/10 |
| 3 | 1,780 | 4/10 | 6/10 | 9/10 | 7/10 | 9/10 | 7/10 |
| 4 | 2,820 | 8/10 | 9/10 | 8/10 | 10/10 | 8/10 | 10/10 |
| 5 | 4,450 | 9/10 | 10/10 | 10/10 | 10/10 | 10/10 | 10/10 |

The percent of total mortalities occurring was 53.9, 79.3, 85.7 and 93.6 at 6, 24, 48 and 72 hours post-treatment, respectively. The last death occurred between 72 and 96 hours post-treatment in male rats in the 1780 and 4450 mg./kg. groups. LD$_{50}$ values and 95 percent confidence limits calculated at 24 hours, 7 and 14 days by the method of Litchfield-Wilcoxon were as follows:

24 hours:
    Male rats, 1800 mg./kg.; 95% confidence limits, 1241–2610 mg./kg.
    Female rats, 1600 mg./kg.; 95% confidence limits, 1230–2080 mg./kg.

7 and 14 days:
    Male rats, 1640 mg./kg.; 95% confidence limits, 1171–2296 mg./kg.
    Female rats, 1100 mg./kg.; 95% confidence limits, 785–1540 mg./kg.

I claim:

1. A 2-thienyliodonium salt having the formula

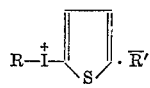

wherein R represents naphthyl, mono-substituted phenyl in which the substituent is nitro, fluoro, chloro, bromo, alkyl, alkoxy, trifluoromethyl, phenyl, or phenoxy, or di-substituted phenyl in which the substituents are fluoro, chloro, bromo, alkyl or alkoxy, and R' represents fluoride, chloride, bromide, iodide, trifluoroacetate, alkanoate, nitrate or tetrafluoroborate and wherein the alkyl, alkoxy and alkanoate radicals contain from 1 to 4 carbon atoms.

2. The compound of claim 1 which is 4-chlorophenyl-2-thienyliodonium chloride.

3. The compound of claim 1 which is 4-chlorophenyl-2-thienyliodonium trifluoroacetate.

4. The compound of claim 1 which is 4-methylphenyl-2-thienyliodonium chloride.

5. The compound of claim 1 which is 3,4-dichlorophenyl-2-thienyliodonium chloride.

6. The compound of claim 1 which is 4-ethoxyphenyl-2-thienyliodonium chloride.

7. The compound of claim 1 which is 3-(trifluoromethyl)phenyl-2-thienyliodonium chloride.

8. The compound of claim 1 which is 4-bromophenyl-2-thienyliodonium chloride.

9. The compound of claim 1 which is 4-ethylphenyl-2-thienyliodonium chloride.

References Cited
UNITED STATES PATENTS

| | | | |
|---|---|---|---|
| 3,207,660 | 9/1965 | Cannon | 260—612 |
| 3,422,152 | 1/1969 | Doub | 260—612 |

OTHER REFERENCES

Gershenfeld et al.: Am. J. Pharmacy, 120, 158–169 (May 1948).

Gershenfeld et al.: Am. J. Pharmacy, 120, 170–175 (May 1948).

Gershenfeld et al.: Am. J. Pharmacy, 121, 343–355 (1949).

Rhodehamel et al.: J. Am. Pharm. Assn., 31, 281–283 (1942).

Beringer et al.: J.A.C.S., 80:4279–4281 (August 1958).

HENRY R. JILES, Primary Examiner

C. M. S. JAISLE, Assistant Examiner

U.S. Cl. X.R.

260—332.2 R, 332.5; 424—275

PO-1050
(5/69)

UNITED STATES PATENT OFFICE
CERTIFICATE OF CORRECTION

Patent No. 3,763,187          Dated  October 2, 1973

Inventor(s) Clarence L. Moyle

It is certified that error appears in the above-identified patent and that said Letters Patent are hereby corrected as shown below:

Column 9, line 53, insert --chloride-- after 4-bromophenyl-2-thienyliodonium.

Column 14, line 34, delete "Terigol" and substitute --Tergitol--.

line 39, delete "CiPhICl" and substitute --ClPhThICl--.

Signed and sealed this 26th day of March 1974.

(SEAL)
Attest:

EDWARD M. FLETCHER, JR.
Attesting Officer

C. MARSHALL DANN
Commissioner of Patents